Feb. 10, 1959  E. LINDAHL  2,872,925
MEDICAMENT APPLICATOR FOR THE TONGUE
Filed July 29, 1954

INVENTOR
ERNEST LINDAHL

Caswell & Lagaard
ATTORNEYS

United States Patent Office 2,872,925
Patented Feb. 10, 1959

2,872,925

MEDICAMENT APPLICATOR FOR THE TONGUE

Ernest Lindahl, Minneapolis, Minn.

Application July 29, 1954, Serial No. 446,535

8 Claims. (Cl. 128—260)

The herein described invention relates to methods of reducing adiposis and has for an object to provide a method in which the sensation of hunger is repressed and the patient's desire for food is diminished.

Another object of the invention resides in the method of reducing adiposis in which the taste buds of the tongue are rendered insentient to reduce the taste for food.

A still further object of the invention resides in applying to the taste buds of the tongue at the manifestation of hunger a mild non-toxic surface anesthetic.

Another object of the invention resides in applying to the taste buds of the tongue at such times an extract of nicotine.

An object of the invention resides in applying to the taste buds of the tongue at such times ethyl-amino-benzoate.

A still further object of the invention resides in applying the medicine to the taste buds in the form of a lozenge to prevent washing of the medicine away from the tongue by the flow of saliva.

An object of the invention resides in utilizing a sublingual applicator for the medicine having two holders for the lozenges disposed one on each side of the tongue and connected together by an elongated connector.

A feature of the invention resides in constructing the holders and connector so that the holders may be adjusted angularly, laterally and longitudinally with respect to the connector and to one another.

Another object of the invention resides in constructing the holders with sockets and in forming the connector from bendable wire or a small rod, slidably and rotatably mounted in said sockets.

An object of the invention resides in detachably mounting the lozenges in the holders.

Other objects of the invention reside in the novel combination and arrangement of parts and in the details of construction hereinafter illustrated and/or described.

The invention covered by this application for patent utilizes an applicator which consists of two holders for disc-like lozenges and which may be constructed of rubber or some other flexible material. These holders have plate-like bodies with lips extending outwardly therefrom and about the perimiters thereof and adapted to engage and hold the lozenges in position with one side exposed. In the bodies of these holders are formed sockets and which slidably and rotatably receive the ends of a connector formed of bendable wire or similar construction. The lozenges have incorporated in them ethyl-amino-benzoate and an extract of nicotine. In carrying out the method of the invention, the relative positions of the lozenge holders are adjusted to meet the requirements by sliding and/or rotating the same on the connector and/or by bending the connector. The applicator with lozenges mounted in the holders is then inserted in the mouth with the holders positioned between the lateral sides of the tongue and the teeth and gums and with the connector beneath the tongue and slightly forward of the lingual frenum. The lozenges are disposed in facing relation so as to engage the lateral and sublingual taste buds of the tongue. After the device has been used for a sufficient length of time, the taste buds become affected by the chemicals in the lozenges and a semi-state of anesthesia in these organs result. In such condition, the patient's taste for certain foods is reduced. The patient is hence able to get along with less food and without appreciable discomfort and reduction in adiposis results.

Figure 1:
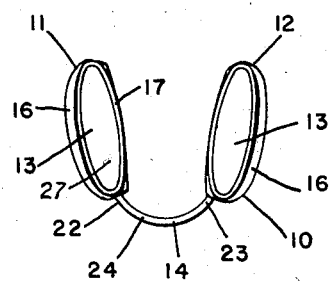
Fig. 1 is a plan view of an applicator illustrating an embodiment of the invention.
Figure 2:
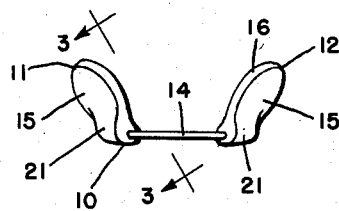
Fig. 2 is a front elevational view of the structure shown in Fig. 1.
Figure 6:
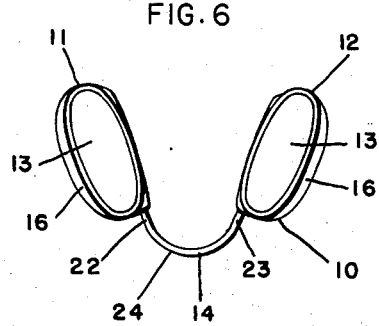
Fig. 6 is a view similar to Fig. 1 showing the parts in altered relation.
Figure 3:
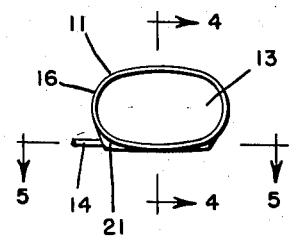
Fig. 3 is a sectional view taken on line 3—3 of Fig. 1.

The applicator used with the invention is indicated by the reference numeral 10 and consists of two holders 11 and 12 for receiving and holding medicated lozenges 13. These holders are connected together by means of a connector 14. The holders are identical in construction except that one is right-hand and the other left-hand. For this reason, only the holder 11 which is shown in detail in Figs. 3, 4 and 5 will be specifically described.

Figure 4:
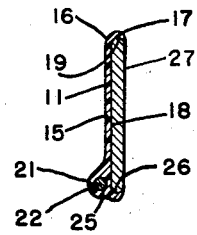
Fig. 4 is a sectional view taken on line 4—4 of Fig. 3.
Figure 5:
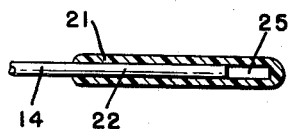
Fig. 5 is a sectional view taken on line 5—5 of Fig. 3.
Figure 7:
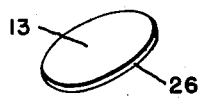
Fig. 7 is a perspective view of one of the lozenges used with the applicator.

The holder 11 is constructed of rubber, poly-ethylene or some other flexible plastic material. This holder is formed with a plate-like body 15 of generally ovular shape which has a lip 16 extending outwardly therefrom and perimetrically about the marginal portion of the same. The outer extremity 17 of this lip is turned in as best shown in Fig. 4. By means of this construction, a cavity 18 is formed in the holder 11 with an undercut recess 19 extending about the same.

The two holders 11 and 12 are connected together by means of connector 14 which is constructed from bendable metal wire or some other similar material. The wire employed is sufficiently soft so that it may be readily bent by hand to move the holders laterally relative to one another and yet sufficiently stiff to maintain the holders in proper operating correlation. For the purpose of attaching the connector to the holders 11 and 12, these holders are constructed with elongated bosses 21 extending longitudinally thereof and cast intergral with the body 15 near the lowermost portions thereof. In these bosses are formed elongated sockets 25 preferably cylindrical and which are open at their forward ends and closed at their rearward ends. The connector 14 is constructed U-shaped in form with two legs 22 and 23 and a bridge 24 connected to the same. These legs are of such diameter that they fit snugly in said sockets so that the holders 11 and 12 are firmly held in place. However, the friction between the holders and connector is not so great but what the holders may be rotated on said connector or moved longitudinally along the legs of the same to adjust the angularity between said holders and the distance between said holders and the bridge 24. Further adjustment of the applicator may be had by bending the bridge 24 of the connector 14.

The lonzenges 13 can be constructed in accordance with the customary practice and are of a shape corresponding to that of the cavity 18. The edges 26 of these lozenges are cut back to conform to the shape of the lips 16 of the holders 11 and 12 and the marginal portions of the same are received in the undecut recesses 19 to expose the active surfaces 27 thereof. These lozenges may be made with kaolin as a base and when fabricated are self supporting and not too frangible. These lozenges contain nicotine, ethyl-amino-benzoate and sugar of milk and such other well known ingredients as are customarily employed in the manufacture of lozenges.

In carrying out the method of the invention, the holders 11 and 12 are first adjusted on the legs 22 and 23 of the connector 14 and the bridge 24 so bent that said bridge extends beneath the tongue in front of the lingual frenum and so that the holders 11 and 12 lie one on each side of the tongue in the portion of the oral cavity between the lateral margins of the tongue and the teeth and gums. Lozenges are then inserted in the cavities 18 of holders 11 and 12 by stretching the outer extremities 17 of the lips 16 and forcing the same in place with the marginal portion thereof received in the recesses 19. When properly positioned, the outer surfaces 27 of the lozenges lie flush with the extremities 17 of the lips 16 of holders 11 and 12. The applicator is then applied with the surfaces 27 in contact with the lateral margins and sublingual portions of the tongue in which the taste buds are disposed. The medicines in the lozenges act on the surface of the tongue and cause partial anesthesia in the taste buds so that the taste buds are rendered insentient. This causes the patient to lose his taste for certain foods and the sensation of hunger to be repressed so that the patient's desire for food is diminished. The patient then finds no craving for special foods or foods in general and is thus able to eat less fattening foods and foods in reduced quantity without hardship. In this manner adiposis is reduced in a gradual manner and without the use of drugs taken internally. The applicator may be worn before meals or at any time the craving for food occurs.

The advantages of the invention are manifest. Adiposis can be gradually reduced and without harmful effect on the patient. The method requires the taking of no drugs internally nor the eating of obnoxious foods. The craving for food is alleviated before meals or whenever the craving for food occurs so that the patient has neither taste or appetite for food or desire to overeat. Due to the fact that the functioning of the digestive tract is not disturbed no ill effects are produced. The medicines employed are not toxic and the method may be used as frequently as found necessary without harm to the patient. The applicator is readily adjustable to fit any mouth and can be easily applied and removed. The manner of use is easily acquired by the patient and no discomfort results with the proper application of the applicator. The device can be constructed at a nominal price and new lozenges readily substituted when the old ones lose their potency.

Changes in the specific form of the invention as herein described, may be made within the scope of what is claimed without departing from the spirit of the invention.

Having described the invention, what is claimed as new and desired to be protected by Letters Patent is:

1. An applicator for applying medicine to the lateral taste buds of the tongue comprising two spaced medicine holders and a U-shaped connector therebetween, said connector having spaced legs and a bridge therebetween, said legs being adapted to lie along the lateral margins of the tongue and said bridge forwardly of the frenum of the tongue and below the tongue, and means acting between the ends of said legs and said holders and slidably and rotatably supporting said holders to position the same opposite the lateral taste buds of the tongue.

2. An applicator for applying medicine to the lateral taste buds of the tongue comprising two spaced medicine holders, and a U-shaped connector therebetween, said connector having spaced legs and a bridge therebetween, said legs being adapted to lie along the lateral margins of the tongue and said bridge forwardly of the frenum of the tongue and below the tongue, said holders having sockets therein extending in an anterior-posterior direction, the ends of said legs being slidably and rotatably mounted in said sockets and being frictionally retained in adjusted position therein.

3. An applicator for applying medicine to the lateral taste buds of the tongue comprising two spaced medicine holders, each having a body with a lip extending outwardly therefrom, disc-like lozenges with one face exposed overlying said bodies and held in place by said lips and a connector connected to said holders and adapted to extend beneath the tongue and forwardly of the frenum, said holders being mounted on said connector with the exposed surfaces of said lozenges adapted to engage the taste buds of the tongue.

4. An applicator for applying medicine to the lateral taste buds of the tongue comprising two spaced medicine holders, each having a body with a lip extending outwardly therefrom to receive a disc-like lozenge, the outer marginal portions of said lip overlying said lozenges to hold the same in position, said lozenges having one face exposed and a connector connected to said holders and adapted to extend beneath the tongue and forwardly of the frenum, said holders being mounted on said connector with the exposed surfaces of said lozenges adapted to engage the taste buds of the tongue.

5. In a device for reducing adiposis, two holders, lozenges carried thereby and having exposed surfaces containing nicotine, said holders being adapted to be positioned with the exposed faces of the lozenges adapted to engage the lateral taste buds of the tongue and a connector connected to said holders and adapted to be disposed below the tongue and forwardly of the frenum of the tongue.

6. In a device for reducing adiposis, two holders, lozenges carried thereby and having exposed surfaces containing ethyl-amino-benzoate, said holders being adapted to be positioned with the exposed faces of the lozenges adapted to engage the lateral taste buds of the tongue and a connector connected to said holders and adapted to be disposed below the tongue and forwardly of the frenum of the tongue.

7. An applicator for applying medicine to the lateral taste buds of the tongue comprising two spaced medicine holders and a U-shaped connector therebetween, said connector having spaced legs and a bridge therebetween, said legs being adapted to lie along the lateral margins of the tongue and said bridge forwardly of the frenum of the tongue and below the tongue, and means acting between the ends of said legs and said holders and rotatably supporting said holders to position the same in proper relation to the lateral taste buds of the tongue.

8. An applicator for applying medicine to the lateral taste buds of the tongue comprising spaced medicine holders constructed of resilient material each having a body with a lip extending outwardly therefrom and about the perimeter thereof and having an undercut, disc like lozenges having active surfaces and mounted on said holder with said surfaces exposed and having beveled edges received in said undercuts and a U-shaped connector connected to said bodies and supporting said lozenges with the active surfaces thereof facing one another.

References Cited in the file of this patent

UNITED STATES PATENTS

| 622,701   | Merritt     | Apr. 11, 1899  |
| 904,521   | Ellis       | Nov. 24, 1908  |
| 1,508,890 | Lasseaux    | Sept. 16, 1924 |
| 2,620,795 | Muhlethaler | Dec. 9, 1952   |

OTHER REFERENCES

United States Dispensatory 24th ed., copyright 1947, pages 447, 1633. (Copy available in Division 43.)